April 12, 1949.　　　　H. H. DOE　　　　2,467,296
MOTOR MOUNTING
Filed June 13, 1945　　　　　　　　2 Sheets-Sheet 1
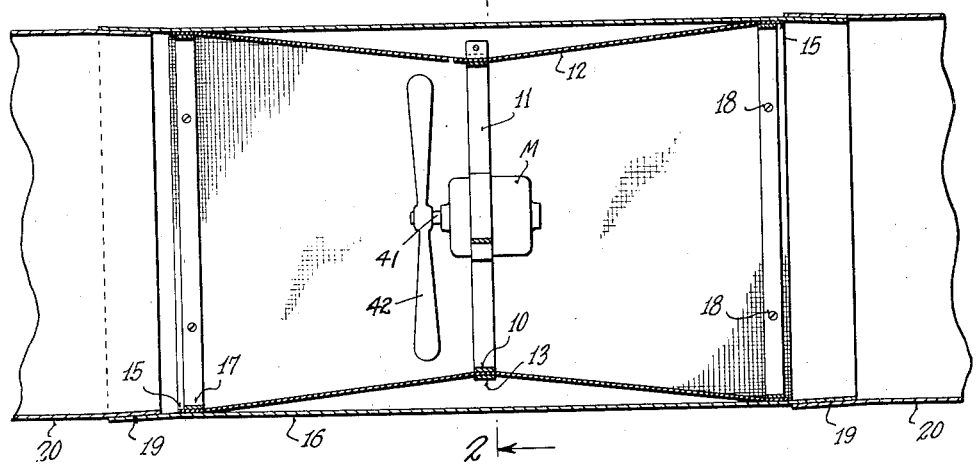
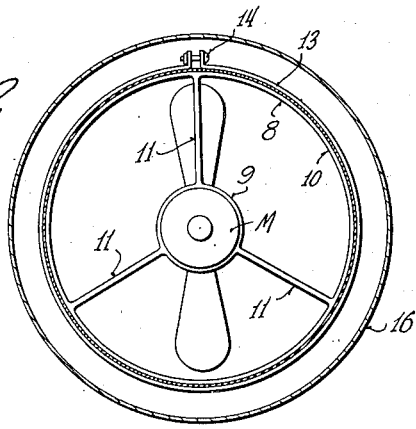
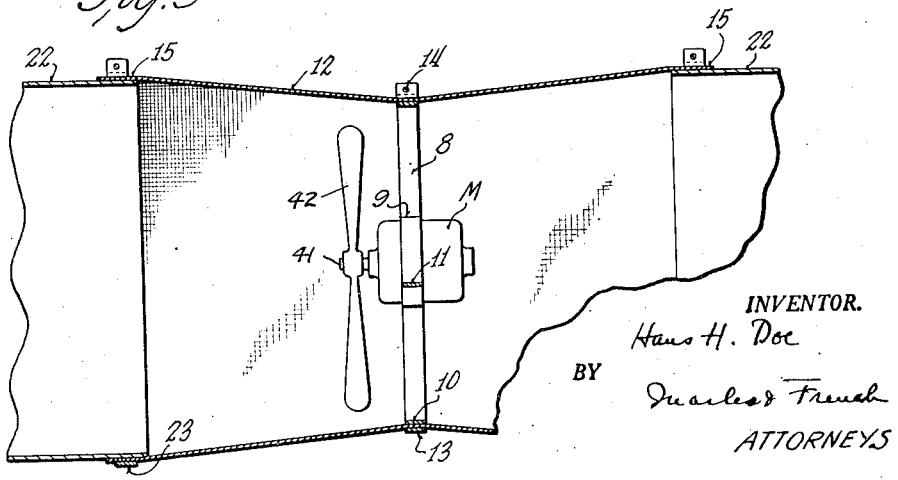
INVENTOR.
Hans H. Doe
BY
Charles & French
ATTORNEYS April 12, 1949.   H. H. DOE   2,467,296
MOTOR MOUNTING
Filed June 13, 1945   2 Sheets-Sheet 2
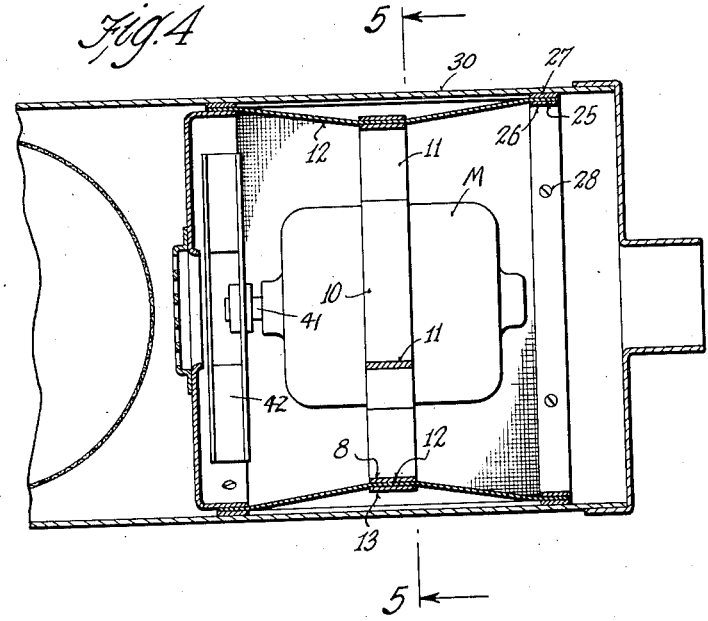
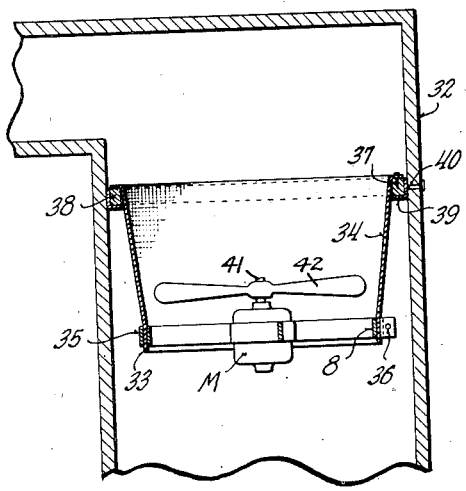
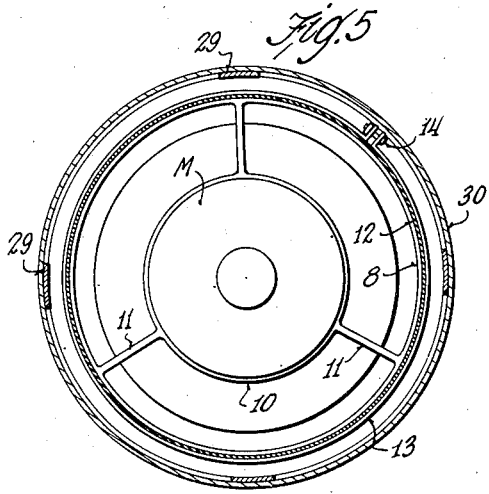
INVENTOR.
Hans H. Doe
BY Quarles & French
ATTORNEYS Patented Apr. 12, 1949

2,467,296

UNITED STATES PATENT OFFICE 2,467,296

MOTOR MOUNTING

Hans H. Doe, Milwaukee, Wis.

Application June 13, 1945, Serial No. 599,261

7 Claims. (Cl. 248—18)

The invention relates to motor mountings and more particularly to motor driven fan or blower mountings.

The object of the invention is to provide a motor mounting of extremely simple construction which will efficiently absorb and deaden vibrations that might be set up by the motor and which reduces the noise of the operation of the device. More particularly, the invention resides in the mounting of the motor on and in a flexible, preferably non-porous, tube or sleeve which in turn is mounted at one or both of its ends, spaced from the motor, to a fixed support, the sleeve in some instances forming a duct or air connection.

The invention further consists in the several features hereinafter set forth and more particularly defined by claims at the conclusion hereof.

In the drawings:

Fig. 1 is a vertical sectional view through a motor mounting embodying the invention;

Fig. 2 is a vertical sectional view taken on the line 2—2 of Fig. 1;

Fig. 3 is a view similar to Fig. 1 showing certain modifications, parts being broken away;

Fig. 4 is a vertical sectional view showing the fan mounting embodying the invention applied to a vacuum cleaner;

Fig. 5 is a vertical sectional view taken on the line 5—5 of Fig. 4;

Fig. 6 is a vertical sectional view through another form of the invention.

Referring to Figs. 1 to 5 of the drawings, the motor mounting includes a metal spider 8 having an inner ring 9 in which the motor M is mounted and an outer ring 10 connected to the inner ring by radially disposed arms or webs 11, said spider being secured to the intermediate part of tubular mounting sleeve 12 of flexible material, preferably a fabric that may be treated with rubber or other suitable material to render it non-porous, the ring 10 being secured to the inner wall of said sleeve by a split metal clamping ring 13 encircling the outer wall of the sleeve opposite the periphery of said ring and having its ends drawn together by a clamping bolt 14. The sleeve 12 is of such length that its ends are spaced from the motor, and several arrangements are shown to adapt the device for different uses.

In Figs. 1 and 2 the ends 15 of the sleeve 12 are anchored to a metal conduit section 16 by means of clamping rings 17 and screws or bolts 18 passing through said rings, sleeve and conduit 18 which has a telescoping joint connection 19 with adjacent conduit sections 20.

In Fig. 3, the sleeve 12 itself forms a conduit section, and its ends 15 are anchored to adjacent conduit sections 22 by split metal clamping rings 23 and bolts 24, similar to the ring 13 and bolt 14, said rings 23 encircling said ends and clamping the sleeve to the ends of the conduits or pipe sections 22.

In Figs. 4 and 5 the ends 25 of the sleeve 12 are shown clamped between inner and outer ring members 26 and 27 by screws 28. The ring members 27 are formed as a part of a metal sleeve which is cut out intermediate the ring portions to form connecting webs 29 therebetween and permitting this assembly to be slipped into the housing 30 of a vacuum cleaner, a portion of the dust bag 31 of which is shown.

In Fig. 6 which shows a part of an air conditioning or filtering unit including a conduit 32, the spider 8 in which the motor M is mounted is clamped to the suspended end 33 of a flexible sleeve member 34, similar in characteristics to the sleeve 12, by a split metal clamping ring 35 and bolt 36. The sleeve member 34 is secured at its upper end by nails or screws 37 to a wooden ring 38 removably carried by a metal angled ring 39 which is mounted in and secured to the conduit 32 by machine screws 40. The drive shaft 41 of the motor M has a suction or blower fan 42 mounted thereon.

With all of the above constructions it will be noted that the motor and its driven element are suspended either at the end or the intermediate portion of the flexible sleeve, and thus isolated from parts that might otherwise be set in vibration by the operation of the motor, and it has been found that the motor mounting above described effectively absorbs and deadens vibrations that might be set up by the motor and reduces noise incident to the running of the motor and fan.

I desire it to be understood that this invention is not to be limited to any particular form or arrangement of parts except in so far as such limitations are included in the claims.

What I claim as my invention is:

1. In a mounting for motor driven fans, blowers and the like, the combination with the motor, of a tubular sleeve of flexible material forming a conduit, means for mounting the motor within and from the sleeve, said sleeve forming the sole support for said motor and its mounting, and means for connecting the sleeve to a fixed supporting means at a point removed from said motor.

2. In a mounting for motor driven fans, blowers and the like, the combination with the motor, of a tubular sleeve of flexible material forming a conduit, means for mounting the motor within and from said sleeve at a point intermediate the ends of said sleeve, said sleeve forming the sole support for said motor and its mounting, and means for fixedly anchoring the ends of said sleeve.

3. In a mounting for motor driven fans, blowers and the like, the combination with the motor, of a spider in which the motor is mounted, said spider having an outer ring section, a tubular sleeve of flexible material, means for clamping said outer ring to said sleeve to suspend the motor within said sleeve, and means for connecting the sleeve to a fixed support at a point removed from said motor.

4. In a mounting for motor driven fans, blowers and the like, the combination with the motor, of a spider in which the motor is mounted, said spider having an outer ring section, a tubular sleeve of flexible material, means for clamping said outer ring to an intermediate portion of said sleeve to suspend the motor within said sleeve, and means for fixedly anchoring the ends of said sleeve.

5. In a mounting for motor driven fans, blowers and the like, the combination with the motor, of a spider in which the motor is mounted, a tubular sleeve of flexible material forming a conduit and to which the outer portion of said spider is secured to support the motor from said sleeve, and means for connecting the sleeve to a fixed support at a point removed from its connection with said motor.

6. In a mounting for motor driven fans, blowers and the like, the combination with a motor, of a spider in which the housing of the motor is mounted, a tubular sleeve of flexible material to the inner wall of which said spider is connected intermediate the ends of said sleeve, said sleeve forming a conduit section, fixed conduit sections, and means for anchoring the ends of said sleeve to the adjacent ends of said fixed conduit sections.

7. In a mounting for motor driven fans, blowers and the like, the combination with a motor, of a spider in which the motor is mounted, a tubular sleeve of flexible material forming a conduit, means for connecting the spider to and within the lower end of said sleeve, said sleeve forming the sole support for said motor and spider, a relatively fixed conduit, and means for detachably connecting the upper end of said sleeve to the inner wall of said conduit to suspend the motor in said conduit.

HANS H. DOE.

REFERENCES CITED

The following references are of record in the file of this patent:

UNITED STATES PATENTS

| Number | Name | Date |
|---|---|---|
| 1,860,884 | Bilde | May 31, 1932 |
| 1,988,951 | Korittke | Jan. 22, 1935 |
| 2,361,266 | Clark | Oct. 24, 1944 |

FOREIGN PATENTS

| Number | Country | Date |
|---|---|---|
| 833,259 | France | Oct. 18, 1938 |